（12）United States Patent
Bond et al.

(10) Patent No.: US 8,431,838 B2
(45) Date of Patent: Apr. 30, 2013

(54) FISHING NET WITH INTEGRAL WEIGHT SCALE

(76) Inventors: Jared Bond, Kerrville, TX (US); Kirk Bond, Kerrville, TX (US)

( * ) Notice: Subject to any disclaimer, the term of this patent is extended or adjusted under 35 U.S.C. 154(b) by 319 days.

(21) Appl. No.: 12/721,744

(22) Filed: Mar. 11, 2010

(65) Prior Publication Data

US 2011/0220426 A1 Sep. 15, 2011

(51) Int. Cl.
*G01G 19/60* (2006.01)
*G01G 19/52* (2006.01)
*G01B 5/02* (2006.01)
*G01B 3/02* (2006.01)
*A01K 77/00* (2006.01)

(52) U.S. Cl.
USPC ........... 177/131; 177/148; 177/232; 177/233; 177/245; 43/7; 43/11; 33/511

(58) Field of Classification Search ................ 43/7, 11; 177/131, 148, 149, 245, 232, 233; 33/511
See application file for complete search history.

(56) References Cited

U.S. PATENT DOCUMENTS

| | | | | |
|---|---|---|---|---|
| 1,088,766 | A * | 3/1914 | Borgardt | 43/12 |
| 1,750,193 | A * | 3/1930 | Reynolds | 177/181 |
| 2,129,469 | A * | 9/1938 | Hedges | 177/131 |
| 2,633,351 | A * | 3/1953 | Fowle | 177/233 |
| 2,750,184 | A * | 6/1956 | Warndahl | 177/127 |
| 3,107,745 | A * | 10/1963 | Bujan | 177/233 |
| 3,223,189 | A * | 12/1965 | Robbins | 177/149 |
| 3,276,527 | A * | 10/1966 | Nelson | 177/149 |
| 3,664,025 | A * | 5/1972 | Barto | 33/27.03 |
| 3,848,689 | A * | 11/1974 | Hilterhaus | 177/233 |
| 4,031,650 | A * | 6/1977 | Popeil | 43/12 |
| 4,216,585 | A * | 8/1980 | Hatter | 33/836 |
| 4,631,851 | A | 12/1986 | Whitehurst | |
| 4,765,420 | A * | 8/1988 | Mengo | 177/149 |
| 4,785,897 | A * | 11/1988 | Keinert, Jr. | 177/232 |
| 4,995,188 | A * | 2/1991 | Ewing | 43/23 |
| 5,031,710 | A * | 7/1991 | Parker et al. | 177/210 FP |
| 5,349,775 | A * | 9/1994 | Mondares | 43/21.2 |
| 5,637,838 | A * | 6/1997 | Arey et al. | 177/148 |
| D391,620 | S * | 3/1998 | Lucas et al. | D22/135 |
| 5,854,447 | A * | 12/1998 | Greenwood et al. | 177/25.14 |
| 6,094,996 | A * | 8/2000 | Campbell et al. | 73/862.474 |
| 6,256,896 | B1 * | 7/2001 | Landauer | 33/512 |
| 6,594,939 | B2 * | 7/2003 | Ondusko | 43/4 |
| 6,615,532 | B2 | 9/2003 | Abel | |
| 8,093,515 | B2 * | 1/2012 | Pigott | 177/148 |
| 2008/0098610 | A1 * | 5/2008 | Lipps | 33/770 |
| 2012/0036758 | A1 * | 2/2012 | Steffens | 43/12 |

* cited by examiner

*Primary Examiner* — Randy W Gibson
(74) *Attorney, Agent, or Firm* — Kammer Browning PLLC

(57) ABSTRACT

A combination fishing net and weight scale with length measuring ruler. The weight scale components are incorporated at a distal end of the handle of the fishing net opposite the end incorporating the net basket. A fish may be retained in the net basket and the distal end of the handle is held up to allow the major portion of the handle and the fishing net basket to extend downward under gravity. The weight of the fish is shown on an indicator positioned in the end (movable) component of the handle that shows through an aligned aperture on the main (fixed) handle component. An internally fixed spring extends between the movable component and the fixed component of the handle. Alternately, a solid state electronic scale may be used in the same position. A length measuring device may be positioned along the length of the handle.

6 Claims, 4 Drawing Sheets

FISHING NET WITH INTEGRAL WEIGHT SCALE

BACKGROUND OF THE INVENTION

1. Field of the Invention

The present invention relates generally to accessories useful in conjunction with the outdoor activity of fishing. The present invention relates more specifically to hand held fishing nets that incorporate measurement devices for weighing fish that are caught and optionally measurement devices for determining their length.

2. Description of the Related Art

The activity of fishing has for a long time been characterized as an outdoor sporting activity instead of the more basic sustenance activity that it previously had been characterized as going back into ancient history. The sport of fishing typically involves the catching of a fish with a fishing rod and reel configured with fishing line and one or more fish hooks. The sport typically involves either the retention of the fish (for consumption) or the release of the fish back into the water. In any event, the sport of fishing has as one of its primary characteristics, the measurement of the size of the fish being caught. This is the case whether the fish is being retained for consumption or in cases of catch and release. In almost every instance of fishing, therefore, it becomes important to measure the weight and/or the length of the fish being caught.

This process of measuring the size of the fish that is caught is relevant for two purposes. First, the size of the fish is often considered to be the measure of the success of the participant in the sporting event. Second, and often more importantly, the size of the fish is the determining factor in whether or not the participant is allowed by law to retain the fish once caught. Fishing, and retaining various species of fish, is often restricted according to the size of the fish wherein too small (and sometimes too large) fish are often prohibited from being retained. It is therefore very important in the outdoor activity of fishing to be able to measure the weight and/or the length of the fish being caught.

As indicated above, fish are typically caught in the outdoor activity through the use of a fishing rod and reel configured with a fishing line and a hook. When a fish is caught on a hook, the fish is typically reeled in to a point near the fisherman, where it is removed from the water. In most cases it is preferable to remove the fish from the water using a fishing net rather than to pull it directly from the water with only the fishing line and hook. A common accessory associated with the outdoor activity of fishing is therefore a hand held fishing net. There are many varieties of such nets but most include a longitudinal handle attached to an oval or circular loop from which is suspended a flexible woven net basket.

In order to carry out the requirements of weighing a fish and measuring its length a variety of accessories have also been developed. The most commonly used accessory for the purpose of weighing a fish is a fishing weight scale of the type that generally involves a spring-loaded linear-movable scale to which the fish is hooked, either directly onto a metal hook on the end of the scale, or indirectly by looping a stringer line through the fish and over the scale end hook. In either case, the linear spring scale is held up by the fisherman and the fish is allowed to dangle below the scale causing movement of the scale indicator and allowing for an eyesight measurement of the weight of the fish. Such weighing, however, will typically require the removal of the fish from the hook and the subsequent placement of a stringer line through the fish or the appropriate placement of the scale hook on the fish. In either case, there are significant additional steps that the fisherman must take in order to remove the fish from the fishing net and to then place and position the fish in conjunction with the scale for weight measurement.

Measuring the length of a fish that has been caught is somewhat easier in standard practice insofar as the hook and line need not be immediately removed from the fish. It is frequently necessary, however, to carry the fish away from the water to a point on the ground, on a table, or on the top of a tackle box or an ice chest, to make an accurate measurement of its length using a tape measure or a ruler. It is not uncommon for ruled measurements to be printed or formed (etched or molded) into the surfaces of various large implements, such as ice chests, coolers, fishing tackle boxes, and the like.

In any event, it is a problem in the existing art to easily measure the weight and length of a fish that has been caught without taking many additional steps to remove the fish from the fishing line and hook and positioning it in conjunction with the fishing scale and/or the length measuring ruler. It would be desirable to have a device to measure the weight of a fish, and in a similar manner measure its length, that did not require the many intermediate steps that not only require additional time, but also damage the health of the fish. It would be desirable if such weight and length measurements could be made immediately after removing the fish from the water, anticipating that the next action might be to release the catch back into the water as unharmed as possible.

Efforts have been made in the past to incorporate both weight measuring devices and length measuring devices into or onto the structures of typical fishing nets. Some very complicated structures have been developed that incorporate weight scales into the handles of fishing nets, while other devices have designed length measuring rulers into the handles or into the net components of the fishing nets. In every instance, however, these devices tend to be overly complex and therefore not very rugged when used in the outdoor environment. Most notably, weight scales that have been incorporated into fishing nets are frequently positioned in such a manner that they are likely to be immersed in water and as such are likely to rust or otherwise degrade over time as a result of such exposure. Other efforts in the past have significantly compromised the integrity and the strength of the fishing net (specifically the handle component) in an effort to incorporate the weight scale or the length measuring devices into the overall structure of the fishing net.

There is therefore a need to provide a simple yet durable weight measuring device integral with a fishing net accessory, such that a caught fish may be easily weighed while still positioned in the net. It would be desirable if such a combination device could be constructed so as to not sacrifice the durability of the handle of the fishing net during ordinary use (as a net). It would further be desirable if a length measuring device (a ruler) were likewise readily available in conjunction with the fishing net so as to provide a measure of the length of the fish without the need to remove it to a separate location.

SUMMARY OF THE INVENTION

In fulfillment of the above and further objectives, the present invention therefore provides an integrated combination fishing net and weight scale device with optional length measuring ruler. The combination fishing net includes a weight measuring scale incorporated into the handle of the fishing net at a point less exposed to water during standard use of the net. The weight scale components are incorporated at a distal end of the fishing net handle opposite the end incorporating the net basket. The use of the weight measuring components of the fishing net involves leaving the fish in the fishing net basket and holding the distal end of the handle to allow the major portion of the handle and the fishing net basket to extend under gravity below the point of support. In this manner, the weight of the fish within the fishing net basket is shown on a small indicator positioned on the end (movable) component of the handle that shows through an aligned aperture on the main (fixed) handle component. The movable end component of the handle moves telescopically with respect to the fixed handle component. The weight measuring assembly preferably incorporates an internally fixed spring extending between the movable component and the fixed component of the handle. An indicator is placed on the movable section of the handle with all components of the weight scale internally positioned within the handle and generally sealed within its interior. Alternate to the tension spring embodiment, a solid state digital scale could be incorporated into the handle in the same position near the movable end component of the handle. A length measuring device in the form of imprinted or engraved markings along the length of the handle (the non-movable portion of the handle) could be incorporated so as to provide a readily available means for measuring the length of the fish. The length scale would preferably extend from the point of attachment between the longitudinal section of the handle of the fishing net and the circular basket section such that the fish might be retained within the net basket and flipped over to extend along the handle for measurement. Further variations and embodiments of the invention as described are anticipated.

DETAILED DESCRIPTION OF THE PREFERRED EMBODIMENTS

Figure 1:
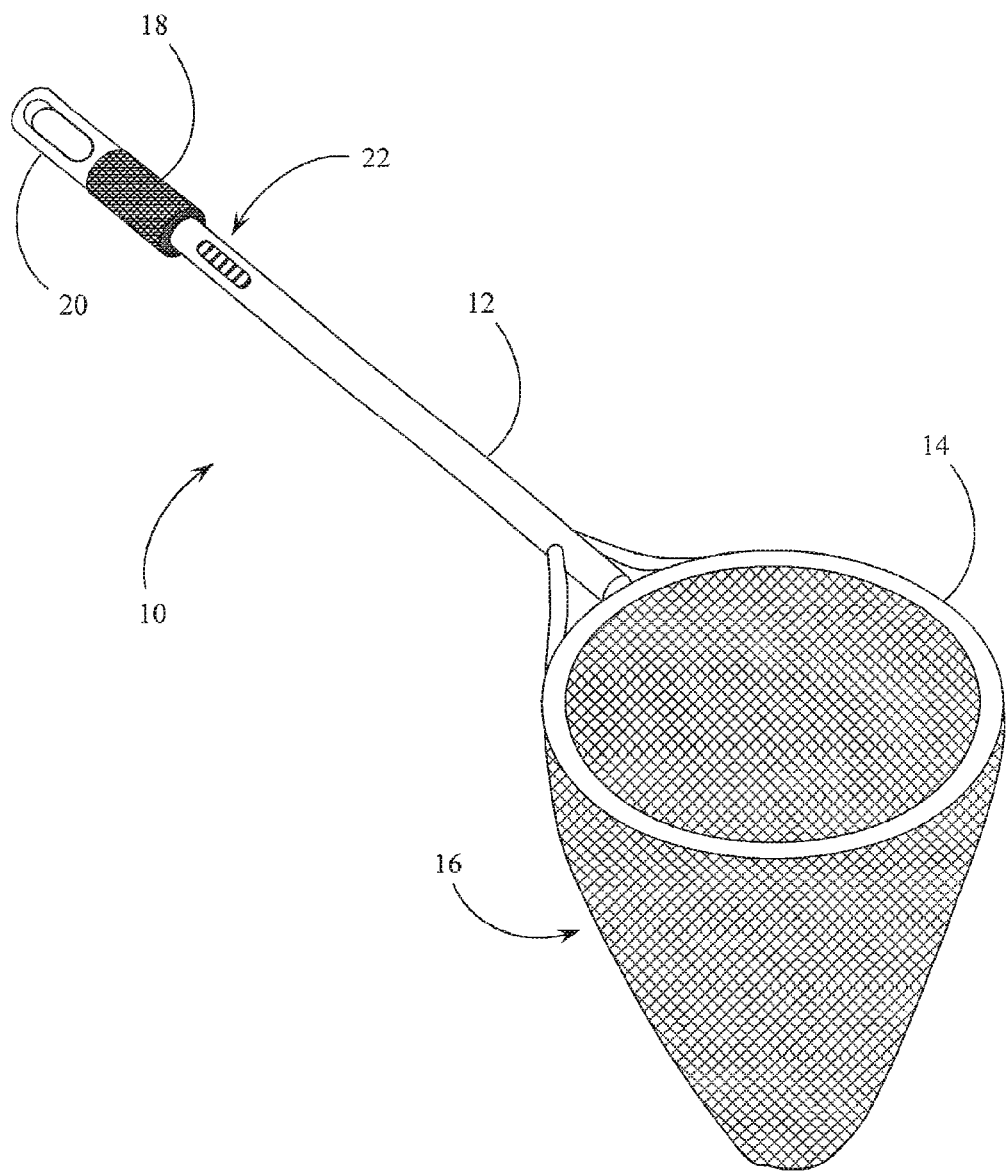
FIG. 1 is a perspective view of the combination fishing net and weight scale apparatus of the present invention.

Reference is made first to FIG. 1 for a description of the combination fishing net and weight scale of the present invention. In FIG. 1, weight scale net 10 is shown in a perspective view illustrating the primary components of the combination device. As one objective of the present invention is to provide a simple and rugged device, the configuration shown in FIG. 1 incorporates most of the same elements associated with a standard fishing net. Weight scale net 10 includes net handle 12 which extends to attach to and hold net basket rim 14. Net basket 16 is a mesh fabric, as is typical for such fishing nets, which is attached to net basket rim 14 and provides the net opening and volume sufficient to handle most types of fish caught in fresh water environments or the smaller to medium sized fish caught in salt water environments. Those skilled in the art will recognize that the size and structure of net basket rim 14 and net basket 16 are subject to the particular fishing environment and may be scaled up or down accordingly without modifying the essential features of the present invention.

The functional components of the present invention are entirely incorporated into net handle 12 at an end opposite that of net basket 16. The components that are externally exposed in this view include handle grip 18, scale hanger 20, and weight scale readout 22. Handle grip 18 is a cushioned grip configured to be the primary grasping point for normal use of the fishing net by the user. Handle grip 18 covers a portion of the distal end of net handle 12 that is rigidly fixed with respect to net basket 16. As a result, the handling of weight scale net 10 by way of handle grip 18 delivers little or no stress upon any of the moveable (weight scale) components of the device. This placement of handle grip 18 facilitates one objective of the present invention to provide a rugged device that is not subject to stress other than when the device is specifically being used as a weight scale to weigh a fish contained in net basket 16.

Scale hanger 20 shown in FIG. 1 represents the movable component of the weight scale assembly associated with net handle 12 which, as described in more detail below, is attached to a sleeve that moves longitudinally (telescopically) within the end of net handle 12. Weight scale readout 22 represents the components (analog or digital) that allow the user to read the weight of the fish in the net basket 16 when the weight scale net 10 is utilized for such purpose.

Figure 2:
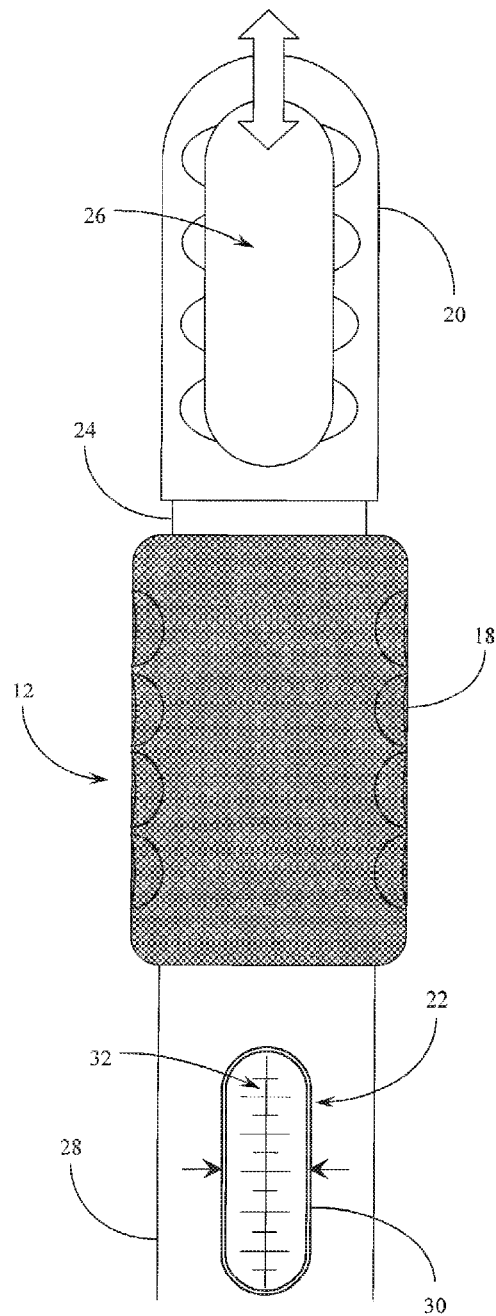
FIG. 2 is a detailed side plan view of the handle end component of the combination fishing net of the present invention showing the weight scale components incorporated therein.
Figure 3:
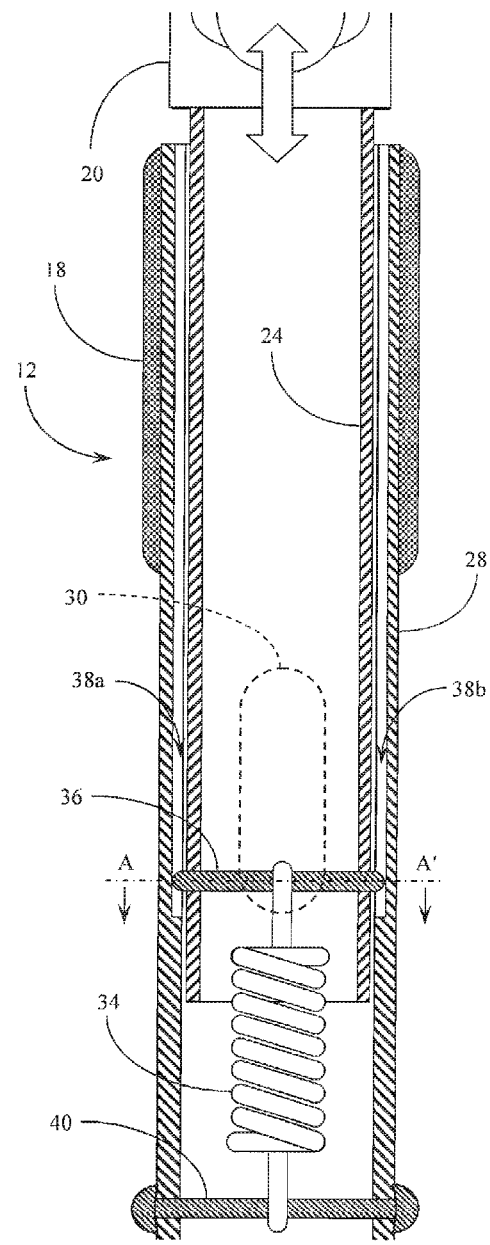
FIG. 3 is a cross-sectional view of the same section of the fishing net handle of the present invention as shown in an exterior view in FIG. 2.

Reference is now made to FIGS. 2 and 3 for a more detailed description of the functional components of the present invention and the manner in which they allow the user to weigh a fish retained in the net basket by grasping and suspending the device by scale hanger 20 instead of handle grip 18. Oriented in the position shown in FIG. 2, the user may lift the device by scale hanger 20 while the fish is contained within the net basket (not seen in this view) and thereby determine the weight of the fish from weight scale readout 22. FIG. 2 is an external view of the distal end of net handle 12 showing the basic components of the present invention. These components include handle grip 18 as described above, as well as scale hanger 20, which is movable in conjunction with inner sleeve 24 within the tubular structure of outer sleeve 28. Inner sleeve 24 includes, at an appropriate location on its outer surface, scale indicia 32 which, when inner sleeve 24 is positioned appropriately within outer sleeve 28, is viewable through scale aperture 30 in outer sleeve 28.

In order to utilize the weight scale features of the present invention, the user grips the scale hanger 20 by means of hanger handle aperture 26 and allows the weight of the weight scale net and the fish contained within the net basket to be supported entirely by the weight scale components. The manner in which this occurs is described in more detail below with respect to FIG. 3. By grasping scale hanger 20 the user may then easily view the weight of the fish (calibrated to offset the empty weight of the net) on weight scale readout 22.

FIG. 3 represents a cross-sectional view of the distal end section of net handle 12 showing the internal components of the system of the present invention. In this view, the lower portion of scale hanger 20 is just visible at the top of the diagram. Scale hanger 20 is attached to and moves in conjunction with inner sleeve 24. Inner sleeve 24 has an outer diameter closely configured to the inner diameter of outer sleeve 28 and may slide telescopically within the confines of outer sleeve 28. Handle grip 18 surrounds one end of outer sleeve 28 leaving open the end into which inner sleeve 24 is inserted as shown above in FIG. 2.

The essential weight measuring component of the preferred embodiment of the assembly of the present invention is scale spring 34 which is configured in both size and strength according to the range of weight measurements that may typically be encountered in conjunction with small to medium sized fish. The scale spring 34 may be any of a number of springs structured according to typical double hook hanging fish scales that are already on the market. A first end of scale spring 34 is connected to fixed spring pin 40 which extends diametrically through outer sleeve 28 at a position below the travel extent of inner sleeve 24. Fixed spring pin 40 thereby provides the fixed end of scale spring 34 while the movable end of scale spring 34 is retained within inner sleeve 24 by means of sliding spring pin 36.

Sliding spring pin 36, once fixed in an end of inner sleeve 24, moves with inner sleeve 24 within the confines of outer sleeve 28 by means of slide channels 38a and 38b. These slide channels 38a and 38b not only provide the channel guides for movement of inner sleeve 24 within outer sleeve 28, but also prevent the rotation of inner sleeve 24 with respect to outer sleeve 28 thereby maintaining the orientation of scale indicia 32 within scale aperture 30 (shown in dashed outline form in FIG. 3).

The structure of the preferred embodiment shown in FIG. 3 may be assembled by first positioning scale spring 34 and sliding spring pin 36 onto inner sleeve 24 before the assembly is inserted into outer sleeve 28. Once these three components are assembled, and scale spring 34 is hanging loose from the initial assembly, the components may be inserted into outer sleeve 28 to a point at which scale spring 34 is positioned adjacent pre-drilled apertures in outer sleeve 28 that allow the insertion and fixing of fixed spring pin 40 there through. In this manner, inner sleeve 24 is retained within outer sleeve 28 but is moveable to the fullest extent of scale spring 34. This movement is reflected by the movement of scale indicia 32 which, when read against a reference point on outer sleeve 28, provides an indication of the weight of the fish being held in the fishing net.

Figure 4:
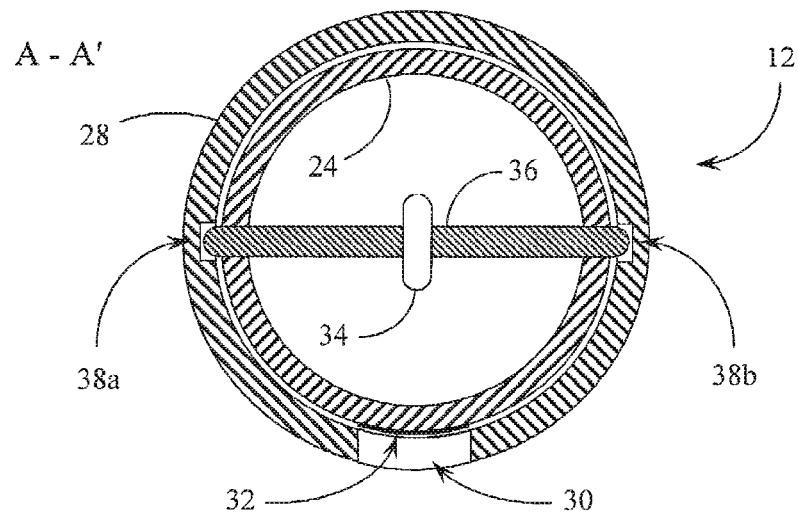
FIG. 4 is a diametrical cross-sectional view of the handle components of the combination fishing net of the present invention taken along section line A-A' shown in FIG. 3.

Reference is now made to FIG. 4 which provides a lateral cross-sectional view taken along section line A-A' shown in FIG. 3. This view in FIG. 4 shows the preferred cylindrical structure of inner sleeve 24 and outer sleeve 28. The view also shows the placement and diametrical positioning of slide channels 38a and 38b and the manner in which they retain sliding spring pin 36. Scale spring 34 is positioned by means of an end eyelet onto sliding spring pin 36, the ends of which ride within slide channels 38a and 38b. Also shown in the cross-sectional view of FIG. 4 is scale indicia 32 positioned on an outer surface of inner sleeve 24 in an orientation that allows it to be read through scale aperture 30 cut into the wall of outer sleeve 28 in an appropriate position. As described above, the assembly shown in FIG. 4 prevents the rotation of inner sleeve 24 with respect to outer sleeve 28 and as a result maintains the orientation of scale indicia 32 so as to be visible through scale aperture 30.

Figure 5:
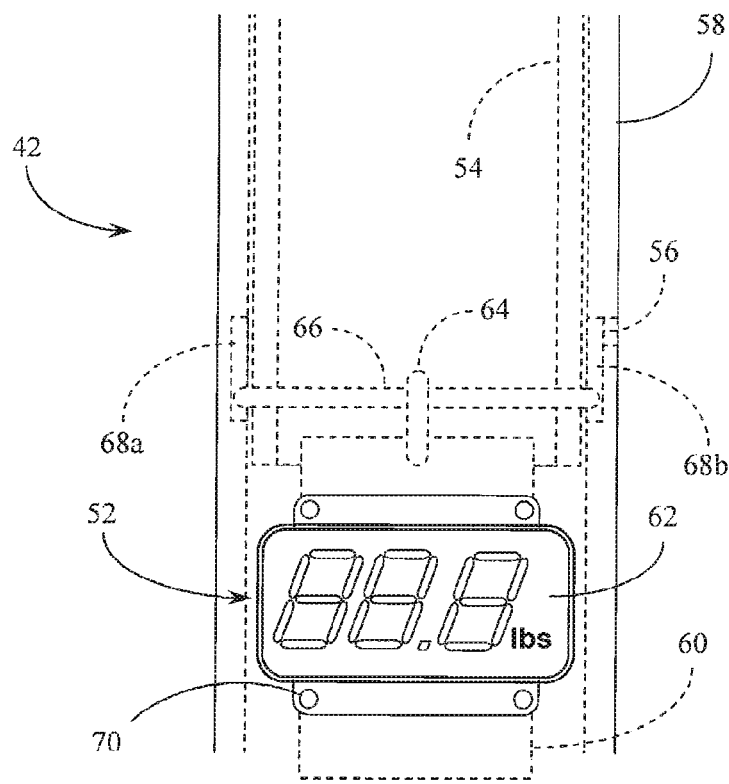
FIG. 5 is a partial cross-sectional view showing the components appropriate for implementation of a digital weight scale device into the handle components of the present invention.

Reference is next made to FIG. 5 for an alternate embodiment of the present invention wherein the mechanical scale spring structure described above is replaced with a solid state digital weight scale device. Most of the structures of the net handle in this embodiment are similar to the first preferred embodiment of the present invention with the solid state scale device essentially replacing the scale spring shown above. In the partial cross-sectional view shown in FIG. 5, alternate net handle 42 is shown to comprise inner sleeve 54 and outer sleeve 58. Weight scale readout 52 positioned on outer sleeve 58 includes solid state scale 60, as well as digital display 62. Solid state scale 60 is fixed onto outer sleeve 58 by means of fixed scale pins (screws) 70 that allow the assembly and disassembly of the device by means of the removal of digital display 62 to expose the components of solid state scale 60. When assembled, fixed scale pins 70 position and fix the solid state scale with respect to outer sleeve 58.

Internally, at one end of solid state scale 60, is positioned scale eyelet 64 which extends to attach to moveable pin 66. Whereas solid state scales of the type shown and utilized herein do not require significant travel in order for accurate measurements to be made, moveable pin 66 may be retained in a much smaller set of slide channels 68a and 68b. Only a very small amount of travel is required for solid state scale 60 to operate in the manner that allows accurate readout through digital display 62.

Assembly of the alternate embodiment shown in FIG. 5 may preferably be carried out in a manner distinct from that shown above with respect to the scale spring structure of FIG. 3. Assembly in this case would initially involve the placement of the solid state scale 60 within outer sleeve 58 and the subsequent insertion of inner sleeve 54 to a point where moveable pin 66 is inserted into the assembly at pin insertion aperture 56. This allows moveable pin 66 to be directed fully into inner sleeve 54 engaging scale eyelet 64 and thereby engaging at its ends slide channels 68a and 68b. Pin insertion aperture 56 may then be covered to prevent the unintended removal of moveable pin 66. Operation of the alternate embodiment is the same as the first preferred embodiment wherein the user grasps the scale hanger 20 and suspends the balance of the fishing net (with the fish in the net) below the hanger allowing for a reading of the weight of the fish (with the scale properly zeroed) on the display.

Figure 6:
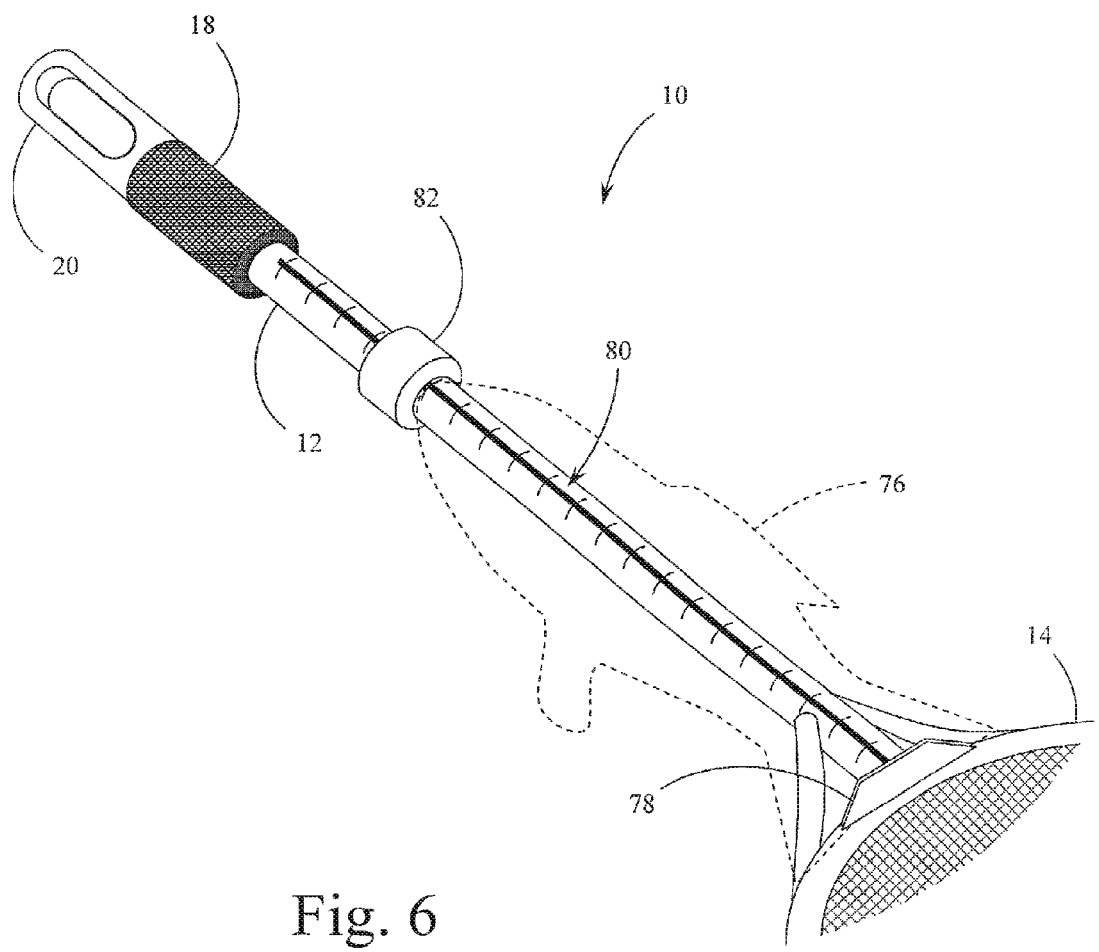
FIG. 6 is a detailed perspective view of the handle of an alternate embodiment of the present invention showing the incorporation of a length measuring scale positioned on the non-movable section of the fishing net handle.

Reference is finally made to FIG. 6 for a description of an optional fish length measurement component of the present invention. In this view, wherein weight scale net 10 is flipped over from the view shown in FIG. 1 to expose a ruled measure scale 80 placed along the net handle 12. This ruled scale 80 may be imprinted, etched, or molded into the exterior surface of net handle 12 with a zero point positioned at the junction between net handle 12 and net basket rim 14. In this manner, fish 76 (shown in dashed outline form) may be placed along net handle 12 with its tail (or nose) positioned against fixed zero stop 78. Stop 78 may simply be a plate that extends up from the point of attachment between net handle 12 and net basket rim 14.

Once the fish 76 is placed along ruled scale 80, sliding end marker 82 may be slid into contact with the nose (or tail) of fish 76 so that the fish may then be removed for the length measurement to be read from the scale as marked by the sliding end marker 82. End marker 82 may simply be a sliding semi-resilient plastic or foam ring that is tight enough to stay put when slid to a position on the net handle 12, but loose enough to be easily slid into place by hand while the fish is in position for length measurement. As indicated above, it may be preferable to keep the fish within the confines of net basket 16 as it is positioned on ruled scale 80. Net basket 16 is typically (preferably) deep enough and flexible enough that it may be allowed to fall back onto the handle of the net where the fish inside the net may then be aligned for length measurement on ruled scale 80 and stretched to its full length. Both the weight measurement and the length measurement may then be carried out without removing the fish from the net.

Although the present invention has been described in terms of the foregoing preferred embodiments, this description has been provided by way of explanation only, and is not intended to be construed as a limitation of the invention. Those skilled in the art will recognize modifications of the present invention that might accommodate specific types of fishing nets or specific types of fishing (fresh water vs. salt water, for example). Variations on the specific sizes, shapes, and weight ranges for weight scale assembly components are also anticipated as long as they retain the functionality associated with the internal handle configuration described herein. Embodiments that provide for alternate weight (force) measuring components are also anticipated. Such modifications, as to component thickness, diameter, composition, component assembly, and force ranges, where such modifications are coincidental to the type of fishing net or type of fishing involved, do not necessarily depart from the spirit and scope of the invention.

We claim:

1. A combination fishing net and weight scale device that allows for the measurement of the weight of a fish held within the fishing net, the fishing net having a net basket and a net handle, the combination device comprising:
   (a) a first handle section comprising a portion of the net handle extending from a point of attachment to the net basket of the fishing net, the first handle section having a distal end apart from the net basket point of attachment, the first handle section further comprising a handle grip member positioned on the distal end thereof;
   (b) a second handle section telescopically positioned in a coaxial arrangement within the first handle section at the distal end thereof, the second handle section extending from an area of telescopic interface with the first handle section to a free end thereof, the free end of the second handle comprising a handle hanger member;
   (c) a weight measuring device positioned within the first and second handle sections at the area of telescopic interface between the two sections, the weight scale measuring device comprising:
      (i) a tension spring extending between a first point of attachment within the first handle section and a second point of attachment within the second handle section, the telescoping movement of the second handle section out from the first handle section serving to stretch the tension spring a distance proportional to the force used to draw the handle sections out from each other;
      wherein the first point of attachment of the tension spring comprises a pin fixed diametrically across an interior space within the first handle section and the second point of attachment of the tension spring comprises a pin fixed diametrically across an interior space within the second handle section;
      wherein the pin fixed within the second handle section extends beyond an exterior surface of the second handle section and wherein an interior wall of the first handle section defines a pair of slide channels diametrically opposed to each other along an interior portion of a length of the first handle section, wherein the extended portions of the first pin fixed within the second handle section are slidingly positioned within the slide channels and thereby guide the telescoping movement of the first handle section with respect to the second handle section; and
      (ii) scale indicia positioned on one of the first and second handle sections and a reference pointer positioned on the other, the scale indicia and reference pointer positioned in visual proximity to each other such that telescoping movement of the second handle section with respect to the first may be visually registered by reference to the movement of the reference pointer with respect to the scale indicia;
      wherein the scale indicia is positioned on the second handle section and comprises a plurality of marked lines representing weight increments and the reference pointer is positioned on the first handle section adjacent an aperture formed in a wall of the first handle section through which the scale indicia may be viewed; and
   (d) a length measuring scale positioned along a length of the first handle section with a sliding end marker positioned on the first handle section, a zero point on the length measuring scale positioned proximate to the point of attachment between the net handle and the net basket, wherein the sliding end marker is movable along the length measuring scale to mark the end of a fish being measured;
   wherein holding the fishing net by the handle hanger member of the second handle section allows the balance of the fishing net, including a fish contained within the net basket, to move incrementally down from the handle hanger member and to therefore cause movement of the scale indicia with respect to the reference indicator in such a manner as to provide an indication of the weight of the fish contained in the net basket.

2. A combination fishing net and weight scale device that allows for the measurement of the weight of a fish held within the fishing net, the fishing net having a net basket and a net handle, the combination device comprising:
   (a) a first handle section comprising a portion of the net handle extending from a point of attachment to the net basket of the fishing net, the first handle section having a distal end apart from the net basket point of attachment, the first handle section further comprising a handle grip member positioned on the distal end thereof;
   (b) a second handle section telescopically positioned in a coaxial arrangement with the first handle section at the distal end thereof, the second handle section extending from an area of telescopic interface with the first handle section to a free end thereof, the free end of the second handle comprising a handle hanger member;
   (c) a weight measuring device positioned within the first and second handle sections at the area of telescopic interface between the two sections, the weight scale measuring device comprising a solid state electronic digital display scale extending between a first point of attachment within the first handle section and a second point of attachment within the second handle section, the telescoping movement of the second handle section out from the first handle section serving to impart a force on the electronic scale proportional to the weight of the balance of the fishing net with a fish contained in the net basket;
   wherein the first point of attachment of the digital display scale comprises a plurality of fixed pins positioned through a wall of the first handle section fixing the weight scale measuring device within the first handle section, and the second point of attachment of the digital display scale comprises a pin fixed diametrically across an interior space within the second handle section;
   wherein the pin fixed within the second handle section extends beyond an exterior surface of the second handle section and wherein an interior wall of the first handle section defines a pair of slide channels diametrically opposed to each other along an interior portion of a length of the first handle section, wherein the extended portions of the pin fixed within the second handle section are slidingly positioned within the slide channels and thereby guide the telescoping movement of the first handle section with respect to the second handle section; and (d) a length measuring scale positioned along a length of the first handle section with a sliding end marker positioned on the first handle section, a zero point on the length measuring scale positioned proximate to the point of attachment between the net handle and the net basket, wherein the sliding end marker is movable along the length measuring scale to mark the end of a fish being measured;

wherein holding the fishing net by the handle hanger member of the second handle section allows the balance of the fishing net, including a fish contained within the net basket, to exert a downward force on the electronic scale in such a manner as to provide an indication of the weight of the fish contained in the net basket on the electronic scale display.

3. The device of claim 1 wherein the aperture formed in the wall of the first handle section is fitted with a sealed transparent window cover.

4. The device of claim 1 wherein the handle hanger member of the second handle section comprises an external grip surface and an internal loop grip and hanging surface defined by an oblong open aperture formed through the handle hanger member.

5. The device of claim 2 wherein the weight measuring device is sealed within the first handle section and the electronic digital display of the weight measuring device is viewable through a sealed transparent window positioned within an aperture formed through the wall of the first handle section.

6. The device of claim 2 wherein the handle hanger member of the second handle section comprises an external grip surface and an internal loop grip and hanging surface defined by an oblong open aperture formed through the handle hanger member.

* * * * *